(12) United States Patent
Kondo

(10) Patent No.: US 9,386,278 B2
(45) Date of Patent: Jul. 5, 2016

(54) TELECONFERENCE METHOD, STORAGE MEDIUM STORING PROGRAM FOR TELECONFERENCE, AND TERMINAL APPARATUS

(71) Applicant: Brother Kogyo Kabushiki Kaisha, Nagoya-shi, Aichi-ken (JP)

(72) Inventor: Yoshiyuki Kondo, Okazaki (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 0 days.

(21) Appl. No.: 14/754,814

(22) Filed: Jun. 30, 2015

(65) Prior Publication Data

US 2015/0381934 A1  Dec. 31, 2015

(30) Foreign Application Priority Data

Jun. 30, 2014 (JP) ................................. 2014-134286

(51) Int. Cl.
    *H04N 7/15* (2006.01)
(52) U.S. Cl.
    CPC .................................... *H04N 7/152* (2013.01)
(58) Field of Classification Search
    CPC .......... H04N 7/15; H04N 7/152; H04N 7/14; H04N 7/141; H04N 7/142; H04L 65/403
    USPC ........ 348/14.01–14.16; 709/204; 379/202.01; 370/260–261
    See application file for complete search history.

(56) References Cited

U.S. PATENT DOCUMENTS

| 8,705,766 B2 | 4/2014 | Takanezawa |
| 2002/0188731 A1 | 12/2002 | Potekhin et al. |
| 2009/0226008 A1 | 9/2009 | Takanezawa |
| 2010/0121961 A1* | 5/2010 | Elleuch ............... H04L 12/1822 709/228 |
| 2012/0206564 A1 | 8/2012 | Potekhin et al. |
| 2014/0095615 A1* | 4/2014 | Ito .......................... H04L 65/80 709/204 |

FOREIGN PATENT DOCUMENTS

| JP | H-0537933 A | 2/1993 |
| JP | H-05292494 A | 11/1993 |
| JP | 4231698 B2 | 3/2009 |
| JP | 2009-212852 A | 9/2009 |

* cited by examiner

*Primary Examiner* — Melur Ramakrishnaiah
(74) *Attorney, Agent, or Firm* — Banner & Witcoff, Ltd.

(57) ABSTRACT

A storage medium stores: a first acquiring instruction of, when newly starting the program, acquiring conference room information for identifying a teleconference of a connection target; a determining instruction of, by referring to particular information, determining whether there is an existing conference process executed by the program that is connected to a same teleconference identified by conference room information matching the conference room information acquired by the first acquiring instruction; and an audio processing instruction of performing at least one of first and second audio processes when there is no existing conference process in a new conference process without performing either the first or second audio process when there is the existing conference process, the first audio process relating to sound collected by a sound collector of the terminal apparatus, the second audio process relating to audio data received by a communicator of the terminal apparatus connected to the network.

10 Claims, 7 Drawing Sheets

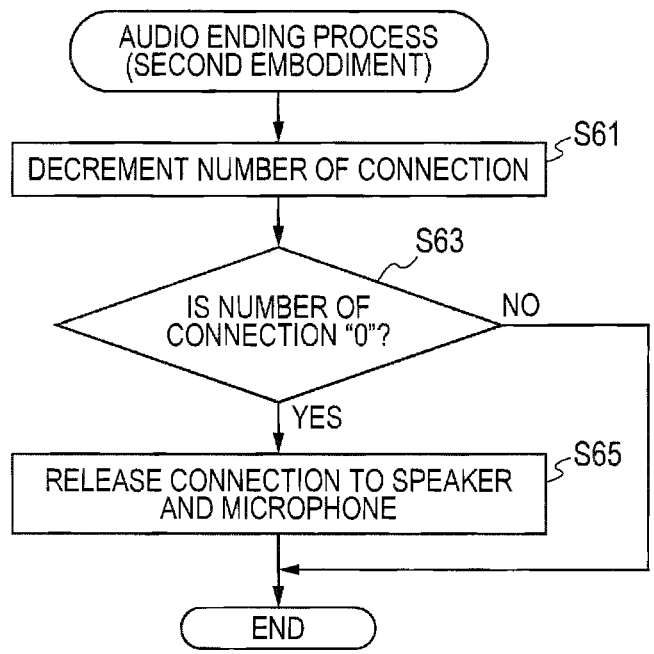

TELECONFERENCE METHOD, STORAGE MEDIUM STORING PROGRAM FOR TELECONFERENCE, AND TERMINAL APPARATUS

CROSS REFERENCE TO RELATED APPLICATIONS

This application claims priority from Japanese Patent Application No. 2014-134286 filed Jun. 30, 2014. The entire content of the priority application is incorporated herein by reference.

TECHNICAL FIELD

This disclosure relates to a terminal apparatus connected to a network and used for a teleconference, a storage medium storing a program executable on a terminal apparatus, and a method of performing a teleconference.

BACKGROUND

Technology for teleconference through a network is known. For example, a multipoint image communication method is disclosed. The multipoint image communication method is realized by a plurality of communication terminal apparatuses and a multipoint connection apparatus. Each communication terminal apparatus includes a plurality of television cameras. Each communication terminal apparatus multiplexes image signals from the plurality of television cameras and transmits the image signals to the multipoint connection apparatus. At this time, effective channel information is also transmitted. The multipoint connection apparatus notifies each communication terminal apparatus about the effective channel information of other communication terminal apparatuses. Each communication terminal apparatus selects an effective channel needed for processing a teleconference from the other communication terminal apparatuses and their effective channels, and inputs the effective channel through a display operation unit. This selection information is transmitted to the multipoint connection apparatus. In the multipoint connection apparatus, image signals of the effective channel are multiplexed. In each communication terminal apparatus, multiplex image signals from the multipoint connection apparatus are separated and displayed on a monitor.

SUMMARY

According to one aspect, this specification discloses a teleconference method executable on a terminal apparatus configured to be connected to a network and be used for a teleconference conducted through the network. The method includes executing a first conference process and a second conference process on the terminal apparatus. The first conference process includes: transmitting video data corresponding to a video image recorded by a first camera of the terminal apparatus to the network through a communicator of the terminal apparatus connected to the network; transmitting audio data corresponding to sound collected by a sound collector of the terminal apparatus through the communicator to the network; and playing audio data acquired from the network through the communicator and outputting sound from a sound output device of the terminal apparatus. The second conference process includes: when newly connecting to a teleconference, acquiring conference room information for identifying a teleconference of a connection target; transmitting video data corresponding to a video image recorded by a second camera of the terminal apparatus through the communicator to the network; by referring to particular information, determining whether the first conference process is connected to a same teleconference identified by conference room information matching the conference room information acquired when newly connecting to the teleconference; and performing at least one of a first audio process and a second audio process when the first conference process is not connected to the same teleconference without performing either of the first audio process and the second audio process when the first conference process is connected to the same teleconference, the first audio process relating to sound collected by the sound collector, and the second audio process relating to audio data received by the communicator.

According to another aspect, this specification also discloses a non-transitory computer-readable storage medium storing a program executable on a terminal apparatus connected to a network and used for a teleconference that is conducted through the network. The program includes: a first acquiring instruction of, when newly starting the program, acquiring conference room information for identifying a teleconference of a connection target; a determining instruction of, by referring to particular information, determining whether there is an existing conference process executed by the program that is connected to a same teleconference identified by conference room information matching the conference room information acquired by the first acquiring instruction; and an audio processing instruction of performing at least one of a first audio process and a second audio process when there is no existing conference process in a new conference process executed by the program that is newly started without performing either of the first audio process and the second audio process when there is the existing conference process in the new conference process, the first audio process relating to sound collected by a sound collector of the terminal apparatus, and the second audio process relating to audio data received by a communicator of the terminal apparatus connected to the network.

According to still another aspect, this specification also discloses a terminal apparatus. The terminal apparatus includes a communicator, a processor, and a memory storing instructions. The communicator is configured to connect to a network. When executed by the processor, the instructions cause the processor to perform: transmitting video data corresponding to a video image recorded by a first camera of the terminal apparatus through the communicator to the network; transmitting audio data corresponding to sound collected by a sound collector of the terminal apparatus through the communicator to the network; playing audio data acquired from the network through the communicator and outputting sound from a sound output device of the terminal apparatus; when newly connecting to a teleconference, acquiring conference room information for identifying a teleconference of a connection target; transmitting video data corresponding to a video image recorded by a second camera of the terminal apparatus through the communicator to the network; by referring to particular information, determining whether there is an existing conference process that is connected to a same teleconference identified by conference room information matching the conference room information acquired when newly connecting to the teleconference; and performing at least one of a first audio process and a second audio process when there is no existing conference process without performing either of the first audio process and the second audio process when there is the existing conference process, the first audio process relating to sound collected by the sound collector, and the second audio process relating to audio data received by the communicator.

BRIEF DESCRIPTION OF THE DRAWINGS

Embodiments in accordance with this disclosure will be described in detail with reference to the following figures wherein:

FIG. 7 is a diagram showing an example of a connection target file;

FIG. 8 is a flowchart showing an audio ending process according to the second embodiment;

DETAILED DESCRIPTION

In a terminal apparatus operated by a user who participates in a teleconference with a teleconference counterpart who operates one or a plurality of counterpart apparatus, a teleconference program is executed when conducting the teleconference. A specification is conceived that one process by this program deals with a video picture captured by one camera out of cameras provided at the apparatus itself. In this specification, the inventor conceived that a plurality of teleconference programs is started in one terminal apparatus having a plurality of cameras and connects to the same teleconference. Each process after starting the program deals with a video picture captured by respective cameras. In this case, in the teleconference, teleconferences process executed concurrently in one terminal apparatus are treated as different connection targets. Hence, in the above-mentioned one terminal apparatus, it is unnecessary to multiplex each video picture captured by a plurality of cameras. Accordingly, for example, even if processing power of the terminal apparatus is not very high, a similar function to that of the above-mentioned prior art can be obtained.

As described above, if a plurality of teleconference processes executed in one terminal apparatus connects to the same teleconference, the plurality of teleconference processes is treated as different connection targets. Hence, audio data transmitted by a first teleconference process is acquired and played by second and following teleconference processes. For example, after that, the user of this terminal apparatus hears his or her own voice at delayed timing.

An example of an object of one aspect of this disclosure is to provide a terminal apparatus, a teleconference program, and a method of teleconference that controls output and non-output of sound, in a case where a plurality of teleconference programs is started and a plurality of teleconference processes is executed in one terminal apparatus.

Some aspects of the disclosure will be described while referring to the accompanying drawings. The disclosure is not limited to configurations described below, and may adopt various configuration in the same technical idea. For example, a part of the configuration shown below may be omitted or substituted with another configuration, and so on. Further, another configuration may be included.

<Teleconference System>

Figure 1:
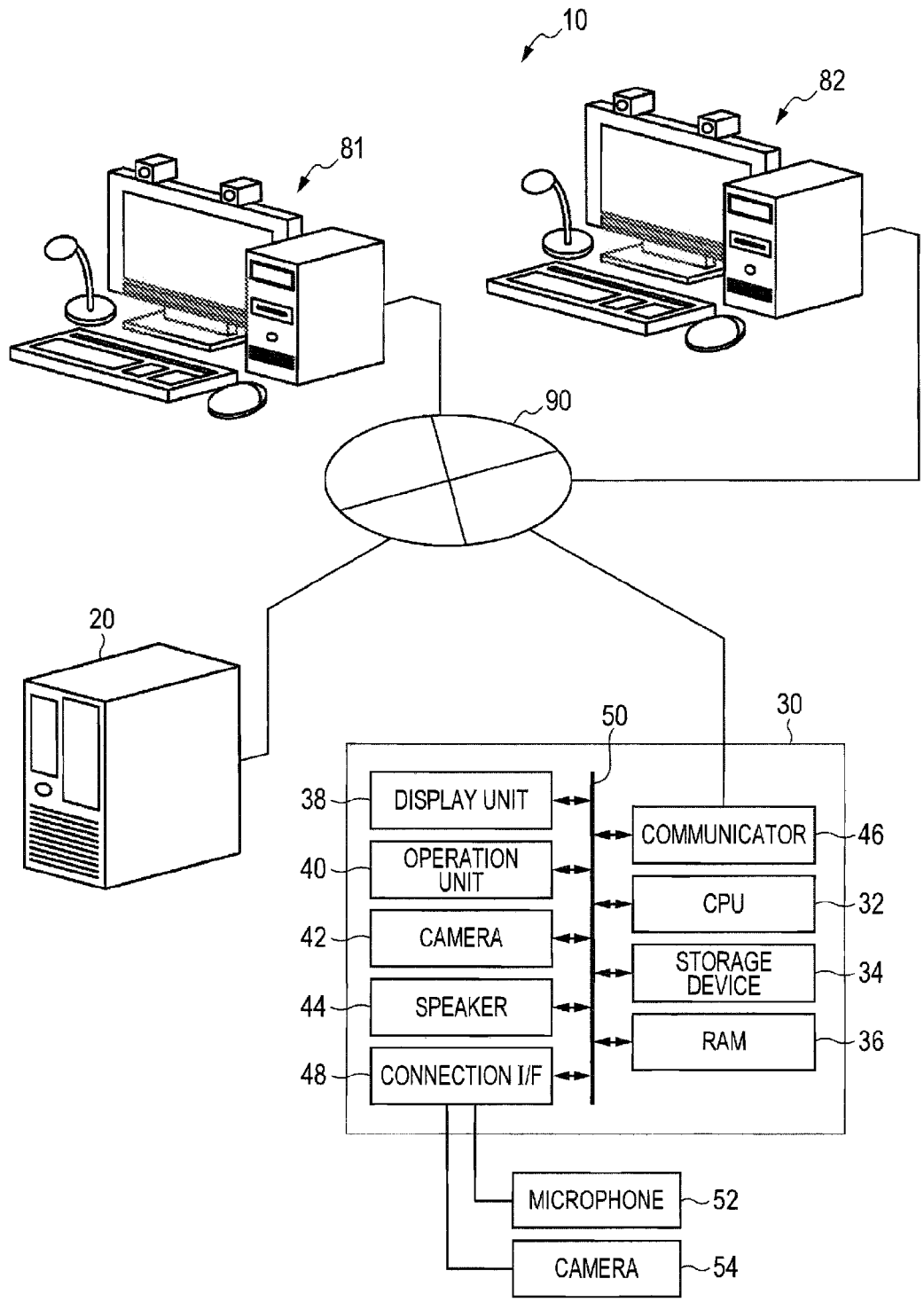
FIG. 1 is a diagram showing an example of a teleconference system.
Figure 2:
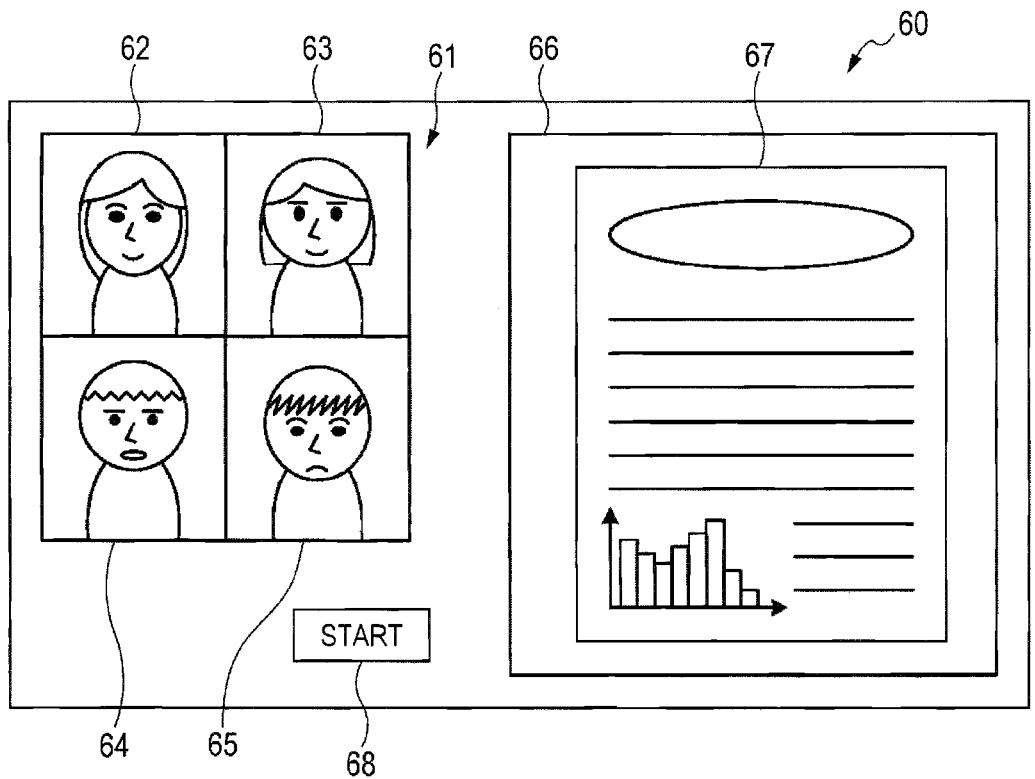
FIG. 2 is a diagram showing an example of a teleconference screen.

A teleconference system 10 will be described while referring to FIGS. 1 and 2. As shown in FIG. 1, the teleconference system 10 includes a server apparatus 20, a terminal apparatus 30, and two counterpart apparatuses 81, 82. In the following description, a teleconference performed by the terminal apparatus 30 and the two counterpart apparatuses 81, 82 is described as an example. That is, it is assumed that the terminal apparatus 30 and the counterpart apparatuses 81, 82 connect to the same teleconference identified by a particular conference ID. The teleconference by the teleconference system 10 may be performed by the terminal apparatus 30 and one counterpart apparatus, or by the terminal apparatus 30 and three or more counterpart apparatuses. The conference ID is conference room information for identifying a teleconference performed by the terminal apparatus 30 and the counterpart apparatuses 81, 82.

The server apparatus 20, the terminal apparatus 30, and the counterpart apparatuses 81, 82 are connected to a network 90. For example, the network 90 is a network such as Internet. In the teleconference system 10, a teleconference by the terminal apparatus 30 and the counterpart apparatuses 81, 82 is performed by way of the server apparatus 20. That is, the server apparatus 20 performs a teleconference of the terminal apparatus 30 and the counterpart apparatuses 81, 82.

The terminal apparatus 30 and the counterpart apparatuses 81, 82 are communication apparatuses having a communication function through the network 90. The terminal apparatus 30 and the counterpart apparatuses 81, 82 are communication apparatuses such as personal computers. Or, the terminal apparatus 30 and the counterpart apparatuses 81, 82 may be communication apparatuses such as smartphones and tablet devices. The configuration of the terminal apparatus 30 will be described later. The term "counterpart apparatus" is used merely for distinguishing the counterpart apparatuses 81, 82 from the terminal apparatus 30, in embodiments in which the terminal apparatus 30 is described mainly. The counterpart apparatuses 81, 82 also perform processes and realize functions that are similar to those of the terminal apparatus 30 described later. The descriptions for the counterpart apparatuses 81, 82 are omitted appropriately. The server apparatus 20 has a hardware configuration similar to that of a server apparatus in a known teleconference system. Hence, descriptions relating to the server apparatus 20 are omitted appropriately.

The terminal apparatus 30 receives operations targeted at URL of the server apparatus 20. In accordance with this URL, the terminal apparatus 30 accesses the server apparatus 20. This causes a teleconference program to be started. A start command for starting a teleconference program includes specifying information of an execution file, specifying information of the server apparatus 20, and specifying information of a conference ID. For example, a start command is defined as "ABCJoin.exe/Server=Japan1.ABCJoin.com/Meeting=1234". A command "ABCJoin.exe" is specifying information that specifies an execution file. A command "Server=Japan1.ABCJoin.com" is specifying information that specifies the server apparatus 20. A command "Meeting=1234" is specifying information that specifies a conference ID. When the teleconference program is started by the start command, in the terminal apparatus 30, a process by the started teleconference program becomes active. In the embodiment, the process by the teleconference program is referred to as "conference process". The conference process being executed by the terminal apparatus 30 becomes a state in which the conference process is connected to a teleconference identified by a conference ID executed by the server apparatus 20. That is, between conference processes of the server apparatus 20 and the terminal apparatus 30, video session for communication of video data and audio session for communication of audio data are established. For example, a first port number is assigned to the video session, and a second port number, which is different from the first port number, is assigned to the audio session.

In the teleconference system 10, a plurality of teleconference programs can be started in each communication apparatus of the terminal apparatus 30 and the counterpart apparatuses 81, 82. In this case, in each communication apparatus, the number of conference processes corresponding to the number of started programs is executed. For example, assume that two cameras 42 and 54 (described later) having different shooting ranges are provided at the terminal apparatus 30. In the terminal apparatus 30, the teleconference program can be started twice so as to execute two conference processes. One of the two conference processes corresponds to the camera 42. The other one of the two conference processes corresponds to the camera 54. Accordingly, in each video session of the two conference processes, different video data captured by each of the cameras 42 and 54 are transmitted to the server apparatus 20.

Although details are omitted, in a similar manner to the terminal apparatus 30, conference processes executed in each of the counterpart apparatuses 81, 82 are connected to the server apparatus 20. Between conference processes in each of the server apparatus 20 and the counterpart apparatuses 81, 82, video session for communication of video data and audio session for communication of audio data are established. As described above, in each of the counterpart apparatuses 81, 82, as well, a plurality of teleconference programs can be started so as to execute a plurality of conference processes at the same time.

FIG. 1 shows a configuration in which each communication apparatus of the terminal apparatus 30 and the counterpart apparatuses 81, 82 has two cameras. Note that the number of cameras provided at each communication apparatus may be one or three or more. Further, the number of cameras provided at each communication apparatus may be different numbers from each other.

The server apparatus 20 receives video data transmitted from each conference process, by using video session of each conference process in each communication apparatus of the terminal apparatus 30 and the counterpart apparatuses 81, 82. The server apparatus 20 transmits the received video data to a conference process different from the conference process that is the transmission source of the received video data. That is, the received video data is forwarded to a conference process different from the conference process of the transmission source, by way of the server apparatus 20. Transmission of video data from the server apparatus 20 is performed through video session in this different conference process.

The server apparatus 20 receives audio data transmitted from each conference process, by using audio session of each conference process in each communication apparatus of the terminal apparatus 30 and the counterpart apparatuses 81, 82. The server apparatus 20 transmits the received audio data to a conference process different from the conference process that is the transmission source of the received audio data. That is, the received audio data is forwarded to a conference process different from the conference process of the transmission source, by way of the server apparatus 20. Transmission of audio data from the server apparatus 20 is performed through audio session in this different conference process.

The video data is video (moving image) data of particular compression technology. The compression technology is H.264, for example. The audio data is data that is compressed by particular compression technology such as MPEG-4 AAC and G.411. Transmission of video data and audio data from the server apparatus 20 is performed by a streaming method.

In each communication apparatus of the terminal apparatus 30 and the counterpart apparatuses 81, 82, a teleconference screen 60 is displayed for each conference process as video data is forwarded from the server apparatus 20. The teleconference screen 60 includes a video picture area 61 and a shared material area 66 (see FIG. 2). The video picture area 61 is an area for displaying video picture corresponding to video data. In each communication apparatus of the terminal apparatus 30 and the counterpart apparatuses 81, 82, a CPU of each communication apparatus acquires video data from the server apparatus 20 through a communicator of each communication apparatus. The CPU decodes and plays acquired video data. The CPU outputs a display command of played video picture to a display unit of each communication apparatus. Video picture is displayed in the video picture area 61 in this way. In the terminal apparatus 30 and the counterpart apparatuses 81, 82, a display target in the video picture area 61 can be set as described below.

For example, assume that two conference processes are executed in each of the terminal apparatus 30 and the counterpart apparatuses 81, 82. Note that, in a first conference process in the terminal apparatus 30, the display target in the video picture area 61 is set as follows. That is, video picture captured by the camera 42 corresponding to the first conference process in the terminal apparatus 30 is set to hidden (not displayed). Video picture captured by the camera 54 corresponding to a second conference process in the terminal apparatus 30 is set to hidden (not displayed). A video picture 62 by a third conference process in the counterpart apparatus 81 is set to display. A video picture 63 by a fourth conference process in the counterpart apparatus 81 is set to display. A video picture 64 by a fifth conference process in the counterpart apparatus 82 is set to display. A video picture 65 by a sixth conference process in the counterpart apparatus 82 is set to display. In this case, in the first conference process in the terminal apparatus 30, the teleconference screen 60 shown in FIG. 2 is displayed. That is, in the teleconference screen 60, four video pictures 62, 63, 64, and 65 are displayed in the video picture area 61. Video data corresponding to video picture captured by the camera corresponding to a certain conference process is not transmitted from the server apparatus 20 to that conference process. Accordingly, if video picture corresponding to this video data is set to display, this video picture is displayed by an internal process of this conference process. For example, assume that, in the terminal apparatus 30, video picture captured by the camera 42 is set to display in the first conference process. In this case, video picture captured by the camera 42 is displayed in the video picture area 61 directly, without acquisition through the communicator 46.

The shared material area 66 is an area for displaying shared material 67. The shared material 67 is material that is shared and used in a teleconference by the terminal apparatus 30 and the counterpart apparatuses 81, 82. A teleconference using the shared material 67 is already realized by a known teleconference system. Hence, other descriptions relating this technique are omitted.

In each communication apparatus of the terminal apparatus 30 and the counterpart apparatuses 81, 82, one of an audio starting process in a first embodiment described later (see FIG. 5), an audio starting process in a second embodiment (see FIG. 6), an audio starting process in a third embodiment (see FIG. 9) is executed. Here, the audio starting process in the first embodiment is adopted, among these audio starting processes. In this case, as shown in FIG. 2, the teleconference screen 60 includes a start button 68. The start button 68 is associated with a start command for starting a new conference process that connects to a teleconference to which a conference process corresponding to the displayed teleconference screen 60 is currently connected. The start command associated with the start button 68 includes subsidiary startup information, in addition to each specifying information included in the above-described start command. The subsidiary startup information is specifying information indicating that a newly-started conference process is not a first-time startup, that is, there is an existing conference process in the same apparatus. For example, the start command including the subsidiary startup information is defined as "ABCJoin.exe/Server=Japan1.ABCJoin.com/Meeting=1234/Child". Here, "Child" is the subsidiary startup information. The start command not including the subsidiary startup information (ABCJoin.exe/Server=Japan1.ABCJoin.com/Meeting=1234) is a start command at the first-time startup.

For example, assume that, in the terminal apparatus 30, in a state where the first conference process is being executed by first-time startup of a teleconference program, a teleconference program is newly started so as to execute a second conference process. In this case, the first conference process is executed as a result of startup of a teleconference program by a start command that does not include subsidiary startup information. The second conference process is executed as a result of startup of a teleconference program by a start command that includes subsidiary startup information. Regarding the start command including subsidiary startup information, information other than the subsidiary startup information is the same as the start command at the first-time startup described above. Hence, other descriptions relating to the start command including the subsidiary startup information are omitted. In a case where the audio starting process in the second embodiment or the audio starting process in the third embodiment is adopted, the start button 68 may be omitted in the teleconference screen 60.

<Terminal Apparatus>

As shown in FIG. 1, the terminal apparatus 30 includes a CPU 32, a storage device 34, a RAM 36, a display unit 38, an operation unit 40, the camera 42, a speaker 44, the communicator 46, and a connection interface 48. Each of these units 32 to 48 is connected to a bus 50. In the embodiment, the connection interface 48 is referred to as "connection I/F 48". A microphone 52 and the camera 54 are connected to the connection I/F 48.

The CPU 32 executes arithmetic processes. The storage device 34 is a computer-readable storage medium. For example, the storage device 34 is a hard disk and/or a flash memory. Also, the storage device 34 may include a ROM. Various programs are stored in the storage device 34. For example, an OS (Operating System) and various applications are stored in the storage device 34. The applications stored in the storage device 34 include a teleconference program. The teleconference program includes programs for executing each process shown in FIGS. 3, 5, 6, and 8-10 described later. An execution file specified by the start command is also included in the teleconference program. The program for executing each process described later may be installed preliminarily in the storage device 34. Or, when the terminal apparatus 30 accesses the server apparatus 20 for connecting to a teleconference, the program may be transmitted to the terminal apparatus 30 from the server apparatus 20 through the network 90 as transmission signals and be installed in the storage device 34 at that timing. In this case, the program may be stored in the RAM 36.

For example, the preliminary install is performed by reading a program stored in a computer-readable storage medium such as a semiconductor memory by a reader (not shown) of the terminal apparatus 30. If the terminal apparatus 30 includes an optical drive (not shown), for example, the preliminary install may be performed by reading the program stored in an optical medium by the optical drive. Also, the preliminary install may be performed by receiving the program stored in a computer-readable storage medium such as a hard disk of a server apparatus (the server apparatus 20 or a server apparatus not shown in the drawings) connected to the terminal apparatus 30 through the network 90, as transmission signals, by the communicator 46 of the terminal apparatus 30. Which method is adopted is determined appropriately by considering various conditions. Note that the computer-readable storage medium need not include signals that are temporarily transmitted. The computer-readable storage medium may be a non-transitory storage medium that does not include transitory signals. It is sufficient that a non-transitory storage medium store information, irrespective of a time period of storing the information.

The RAM 36 is a memory area that is used when the CPU 32 executes various programs. The RAM 36 stores particular data and information that are used by a process when the process is executed. In the terminal apparatus 30, the CPU 32 appropriately executes the OS and the teleconference program stored in the storage device 34, thereby controlling the terminal apparatus 30. By this operation, in the terminal apparatus 30, for example, various processes including the above-described first and second conference processes are executed, and various functions are realized. The conference process executed by the terminal apparatus 30 is identified by a process ID. The process ID is information for identifying a conference process.

The display unit 38 is a liquid crystal display, for example. The display unit 38 displays various kinds of information. The display unit 38 displays the teleconference screen 60 and a camera selecting screen 70 (see FIG. 4) described later. The operation unit 40 receives inputs such as various instructions to the terminal apparatus 30. The operation unit 40 includes a keyboard and a mouse. Details are omitted, but a process that generates operational information corresponding to each operation to the keyboard and mouse is technology used in known personal computers. The terminal apparatus 30 also adopts this technology.

The camera 42 is an image capturing device that is built in the terminal apparatus 30, for example. The camera 42 captures an external image in a particular direction of the front side of the terminal apparatus 30. The speaker 44 is an example of a sound output device that outputs sound. For example, sound outputted by the speaker 44 is sound corresponding to audio data transmitted from the server apparatus 20 described above. The communicator 46 connects the terminal apparatus 30 to the network 90, and performs data communication through the network 90. In the terminal apparatus 30, various data are transmitted to and received from the server apparatus 20 through the communicator 46. For example, data transmitted and received through the network 90 include video data and audio data. The communicator 46 is an interface circuit that is adapted to the Ethernet (registered trademark) standard, for example. Connection to the network 90 by the communicator 46 may be wireless connection or wired connection.

The connection I/F 48 is an interface for connecting a particular apparatus to the terminal apparatus 30. For example, the connection I/F 48 is an interface having a USB (Universal Serial Bus) port. The microphone 52 connected to the connection I/F 48 is an example of a sound collector that collects external sound. For example, the microphone 52 collects voices outputted by a user who operates the terminal apparatus 30. If there are two users who operate the terminal apparatus 30, the microphone 52 collects voices outputted by the two users. The camera 54 connected to the connection I/F 48 is an image capturing device that is externally connected to the terminal apparatus 30. The camera 54 is set to the terminal apparatus 30 in a state where the camera 54 captures external images from a different direction from the camera 42. For example, assume that there are two users who operate the terminal apparatus 30 and who participate in the same teleconference. The camera 42 captures an external image including one of the two users. The camera 54 captures an external image including the other one of the two users.

The terminal apparatus 30 is different from a known communication apparatus in that the storage device 34 or the RAM 36 stores a teleconference program including programs of each process described later (see FIGS. 3, 5, 6, and 8-10). However, in terms of hardware, the terminal apparatus 30 is a communication apparatus that is the same as a known communication apparatus.

<Process Executed by Terminal Apparatus>

A camera starting process, an audio starting process, and an audio ending process executed by the terminal apparatus 30 in a case where a teleconference is performed by the terminal apparatus 30 and the counterpart apparatuses 81, 82 will be described. Regarding the audio starting process, three examples will be described. Regarding the audio ending process, an audio ending process of the second embodiment corresponding to the audio starting process of the second embodiment, and an audio ending process of the third embodiment corresponding to the audio starting process of the third embodiment will be described. Each process in the first embodiment to the third embodiment is executed at particular timing described later, in a conference process in response to startup of the teleconference program by a start command. The start command is either one of two start commands described above. After starting the teleconference program, the CPU 32 stores the start command of this startup in the RAM 36.

<Camera Starting Process>

The camera starting process will be described while referring to FIG. 3. The camera starting process is started at the time of startup of the teleconference program. The CPU 32 having started the camera starting process generates the camera selecting screen 70 (S11). Next, the CPU 32 controls to display the generated camera selecting screen 70 (S13). That is, the CPU 32 outputs a display command of the camera selecting screen 70 to the display unit 38. By this operation, the camera selecting screen 70 is displayed on the display unit 38.

Figure 4:
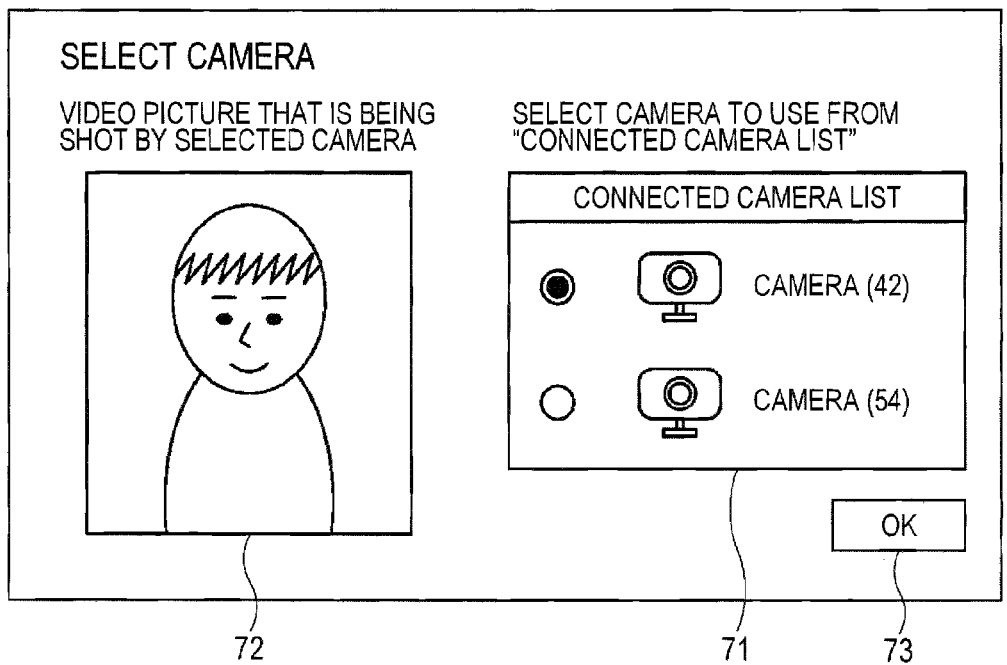
FIG. 4 is a diagram showing an example of a camera selecting screen.

As shown in FIG. 4, the camera selecting screen 70 includes a selection area 71, an image viewing area 72, and an OK button 73. In the selection area 71, a connected camera list is displayed. The connected camera list is a view (list) of cameras provided at the terminal apparatus 30. The cameras provided at the terminal apparatus 30 are managed by the OS. The selection area 71 is an area that receives a selection instruction for selecting one camera from among the connected camera list. For example, the CPU 32 makes an inquiry to the OS about cameras provided at the terminal apparatus 30. Then, the CPU 32 includes a view of cameras acquired from the OS in the connected camera list in the selection area 71. In the embodiment, the cameras 42 and 54 are illustrated as cameras provided at the terminal apparatus 30. Accordingly, in the selection area 71, the connected camera list including the cameras 42 and 54 as options is displayed. The selection instruction is received in response to an operation to the selection area 71 through the operation unit 40.

The image viewing area 72 is an area that displays a video picture that is currently shot by the camera selected by the selection area 71. When a selection instruction is received, the CPU 32 acquires the selection instruction. For example, assume that selection of the camera 42 is received in the selection area 71. In this case, the CPU 32 acquires a selection instruction indicative of the camera 42. The CPU 32 acquires a video picture that is currently shot from the camera 42, and controls to display this video picture in the image viewing area 72. The CPU 32 outputs a display command of the acquired video picture to the display unit 38. By this operation, in the display unit 38, a video picture shot by the camera 42 is displayed in the image viewing area 72 (see FIG. 4). The user of the terminal apparatus 30 can select one camera while viewing this video picture.

The OK button 73 is a button that receives a confirmation instruction for confirming selection of the camera selected in the selection area 71. By receiving the confirmation instruction, selection of one camera is confirmed. The confirmation instruction is received in response to an operation to the OK button 73 through the operation unit 40. When the confirmation instruction is received, the CPU 32 acquires the confirmation instruction.

The CPU 32 confirms the camera selected at the timing of acquisition of the confirmation instruction, as the camera that is used in a conference process by the teleconference program that is started this time. The CPU 32 initializes the selected camera (S15). At that time, the CPU 32 sets connection to the selected camera. This setting is managed by the OS. Next, the CPU 32 starts transmission of video data corresponding to video picture from the initialized camera (S17). That is, the CPU 32 encodes the video picture from the initialized camera, and starts generating video data. The CPU 32 outputs a transmission command of the generated video data to the communicator 46. Then, transmission of video data from the communicator 46 to the server apparatus 20 is started. A video session established in the conference process due to startup this time is used for transmission of video data. After executing S17, the CPU 32 ends the camera starting process.

Transmission of video data started in S17 ends in response to ending of the conference process corresponding to startup of the teleconference program that has started the camera starting process. The conference process ends when a termination instruction of the conference process is received. For example, the termination instruction is received in response to an operation for closing the teleconference screen 60 by the conference process through the operation unit 40. The CPU 32 having acquired the termination instruction stops generating video data in the conference process to be terminated. By this operation, transmission of video data is stopped. The CPU 32 releases the camera that is set to connection in S15. That is, the CPU 32 notifies the OS managing connection to cameras about releasing of connection to this camera.

<Audio Starting Process of First Embodiment>

The audio starting process of the first embodiment will be described while referring to FIG. 5. The audio starting process is started at timing when the terminal apparatus 30 is connected to the server apparatus 20 and an audio session is established. The CPU 32 having started the audio starting process acquires the start command that is stored in the RAM 36 when the teleconference program this time is started (S21). Next, the CPU 32 determines whether the start command acquired in S21 includes subsidiary startup information (S23). The above-described start command will be described as an example. Assume that the acquired start command is "ABCJoin.exe/Server=Japan1.ABCJoin.com/Meeting=1234". In this case, the CPU 32 determines that the start command does not include subsidiary startup information "Child" (S23: No), and advances the process to S24. Assume that the acquired start command is "ABCJoin.exe/Server=Japan1.ABCJoin.com/Meeting=1234/Child". In this case, the CPU 32 determines that the start command includes subsidiary startup information "Child" (S23: Yes), and ends the audio starting process. In S23, it is determined whether the startup of the teleconference program this time is a first-time startup (S23: No), or is a startup in a state where a conference process is executed (S23: Yes). In the audio starting process of the first embodiment, the startup this time is a startup of the teleconference program by the start command acquired in S21.

In S24, the CPU 32 determines whether the terminal apparatus 30 can connect to the speaker 44 and the microphone 52. For example, when connecting to the microphone 52, the CPU 32 performs a process of opening a device file corresponding to a device driver of the microphone 52 that is provided by the OS. If the process of opening the device file succeeds, the CPU 32 determines that the terminal apparatus 30 can connect to the microphone 52. On the other hand, if the process of opening the device file fails, the CPU 32 determines that the terminal apparatus 30 cannot connect to the microphone 52. Similar processes are performed for the speaker 44. For example, a case in which the terminal apparatus 30 cannot connect to the speaker 44 or the microphone 52 is a case in which the device file corresponding to the device driver of the speaker 44 or the microphone 52 is opened exclusively by another process. For example, in a case where the teleconference program is set to exclusively open the device file corresponding to the device driver of the speaker 44 or the microphone 52, a fact that the terminal apparatus 30 cannot connect to the speaker 44 or the microphone 52 means that a conference process is currently executed. According to the process of S24, for example, even when a teleconference program is started without receiving an operation to the start button 68 (S23: No) in a state where a conference process is executed, it is possible to determine whether the startup this time is a first-time startup (S24: Yes) or is a startup in a state where the conference process is executed (S24: No).

If the terminal apparatus 30 cannot connect to the speaker 44 or the microphone 52 (S24: No), the CPU 32 ends the audio starting process. If the terminal apparatus 30 can connect to the speaker 44 and the microphone 52 (S24: Yes), the CPU 32 sets connection to the speaker 44 (S25). This setting is managed by the OS. After that, the CPU 32 starts a sound playing process. The sound playing process is a process targeted at audio data received by the communicator 46 in an audio session established in the conference process corresponding to the startup this time. The CPU 32 acquires audio data through the communicator 46. The CPU 32 decodes and plays the acquired audio data. The CPU 32 controls output of sound corresponding to audio data that is obtained by playing. The CPU 32 outputs an output command of sound to the speaker 44. By this operation, sound is outputted from the speaker 44.

Next, the CPU 32 determines whether microphone mute is set to "ON" (S27). In the teleconference system 10, for example, a conference room setting is preliminarily determined for each teleconference identified by a conference ID. The conference room setting is a setting for specifying "ON" or "OFF" of microphone mute at the time of startup. The conference room setting is stored in the server apparatus 20 in association with the conference ID. In S27, the CPU 32 controls transmission of a conference-room-setting request. The conference-room-setting request is a command for requesting the server apparatus 20 to transmit a conference room setting in association with the conference ID of a teleconference to which the conference process by the startup this time connects. The transmission destination is set to the server apparatus 20. The CPU 32 outputs a transmission command of the conference-room-setting request to the communicator 46. By this operation, the conference-room-setting request is transmitted from the communicator 46 to the server apparatus 20. In response to the conference-room-setting request, the server apparatus 20 transmits the conference room setting to the terminal apparatus 30 that has made a request. The communicator 46 receives the conference room setting from the server apparatus 20. The CPU 32 acquires the conference room setting through the communicator 46.

If the microphone mute is set to "OFF" in the conference room setting (S27: No), the CPU 32 sets connection to the microphone 52 (S29). This setting is managed by the OS. After that, the CPU 32 starts a sound collecting process. The sound collecting process is a process of encoding sound collected by the microphone 52 and generating audio data. The CPU 32 having started the sound collecting process encodes sound collected by the microphone 52 and generates audio data. The CPU 32 controls transmission of the generated audio data. Transmission of audio data uses the audio session established in the conference process by the start command acquired in S21. The CPU 32 outputs a transmission command of audio data to the communicator 46. By this operation, the audio data is transmitted from the communicator 46 to the server apparatus 20. If the microphone mute is set to "ON" in the conference room setting (S27: Yes) or after S29 is executed, the CPU 32 ends the audio starting process.

In the audio starting process of the first embodiment, as described above, if the start command includes subsidiary startup information (S23: Yes), the audio starting process ends. In this case, the CPU 32 does not execute S25. Accordingly, connection to the speaker 44 by the OS remains unconnected. The CPU 32 acquires, through the communicator 46, audio data received by the communicator 46 in the audio session established in the conference process by the start command acquired in S21. However, the CPU 32 does not execute decoding of this audio data. If the start command includes subsidiary startup information (S23: Yes), the CPU 32 does not execute S29. Accordingly, connection to the microphone 52 by the OS remains unconnected. In this case, sound is not collected by the microphone 52, and audio data is not generated. That is, if the start command includes subsidiary startup information (S23: Yes), in the conference process by the start command acquired in S21, both of the sound playing process and the sound collecting process are unexecuted. The same goes for a case in which a negative determination is made in S24 (S24: No).

In the audio starting process of the first embodiment, as described above, if the microphone mute is set to "ON" in the conference room setting (S27: Yes), the audio starting process ends. In this case, the CPU 32 does not execute S29. Accordingly, connection to the microphone 52 by the OS remains unconnected. However, the microphone mute can be changed to "OFF" by a particular operation through the operation unit 40. When this particular operation is received by the operation unit 40, the CPU 32 sets connection to the microphone 52 as in S29, and starts the sound collecting process.

The sound playing process started in S25 and the sound collecting process started in S29 end in response to termination of the conference process corresponding to the start command acquired in S21. As described above, the conference process ends when a termination instruction of the conference process is received. For example, the termination instruction is received in response to an operation of closing the teleconference screen 60 of the conference process through the operation unit 40. Assume that the conference process to be terminated was started by a start command (ABCJoin.exe/Server=Japan1.ABCJoin.com/Meeting=1234) which does not include subsidiary startup information. In this case, the CPU 32 releases the speaker 44 set to connection in S25 and the microphone 52 set to connection in S27 or by the above-described subsequent operation. That is, the CPU 32 notifies the OS managing connection to these devices about releasing of connection to the speaker 44 and releasing of connection to the microphone 52. Assume that the conference process to be terminated was started by a start command (ABCJoin.exe/Server=Japan1.ABCJoin.com/Meeting=1234/Child) which includes subsidiary startup information. In this case, neither one of connection to the speaker 44 and connection to the microphone 52 is set. Accordingly, releasing of connection to the speaker 44 and releasing of connection to the microphone 52 are skipped.

<Second Embodiment>
<Audio Starting Process>

The audio starting process of the second embodiment will be described while referring to FIG. 6. In a similar manner to the above-described audio starting process (see FIG. 5), the audio starting process is started at timing when the terminal apparatus 30 is connected to the server apparatus 20 and an audio session is established. The CPU 32 having started the audio starting process acquires the start command that is stored in the RAM 36 when the teleconference program this time is started (S41). Next, the CPU 32 determines whether a conference ID matching the conference ID included in the start command acquired in S41 is stored (registered) in a connection target file (S43). The connection target file is a table-format file in which a conference ID identifying a teleconference to which the terminal apparatus 30 is connected is associated with the number of conference processes that are connected to the teleconference identified by the conference ID (see FIG. 7). In the embodiment, the number of conference processes that are connected to the teleconference identified by the conference ID is referred to as "number of connection". The connection target file is stored in a particular memory area that is secured in one of the storage device 34 and the RAM 36.

The above-described start command "ABCJoin.exe/Server=Japan1.ABCJoin.com/Meeting=1234" will be described as an example. The CPU 32 identifies the conference ID "1234" from the start command. The CPU 32 accesses the connection target file and determines whether a conference ID matching the identified conference ID "1234" is stored. If the same conference ID is not stored in the connection target file (S43: No), the CPU 32 advances the process to S45. If the same conference ID is stored in the connection target file (S43: Yes), the CPU 32 advances the process to S53. If the connection target file is in a state shown in FIG. 7, the CPU 32 determines that a conference ID matching the identified conference ID "1234" is stored in the connection target file (S43: Yes). In S43, it is determined whether the startup of the teleconference program this time is a first-time startup (S43: No) or is a startup in a state where a conference process is executed (S43: Yes). In the audio starting process of the second embodiment, the startup this time is a startup of the teleconference program by the start command acquired in S41.

In S45, the CPU 32 newly stores the conference ID identified in S43 in the connection target file, and increments the number of connection associated with the stored conference ID. In this case, a number "1" is stored as the number of connection associated with the conference ID (see FIG. 7). In some cases, at timing of S45, there is no conference process, and no connection target file exists. In this case, the CPU 32 creates a new connection target file.

Next, the CPU 32 sets connection to the speaker 44 (S47). This setting is managed by the OS, as described above. After that, the CPU 32 starts a sound playing process. The sound playing process is performed for audio data received by the communicator 46 in the audio session established in the conference process. The sound playing process in S47 is performed in a similar manner to the sound playing process described in connection with S25 in FIG. 5. Accordingly, other descriptions for S47 are omitted.

Next, the CPU 32 determines whether microphone mute is set to "ON" in the conference room setting (S49). Step S49 is executed in a similar manner to S27 in FIG. 5. Accordingly, other descriptions for S49 are omitted. If the microphone mute is set to "OFF" in the conference room setting (S49: No), the CPU 32 sets connection to the microphone 52 (S51). This setting is managed by the OS, as described above. After that, the CPU 32 starts the sound collecting process. In the sound collecting process, audio data is transmitted from the communicator 46 through the audio session established in the conference process. The sound collecting process in S51 is performed in a similar manner to the sound collecting process described in connection with S29 in FIG. 5. Accordingly, other descriptions for S51 are omitted. If the microphone mute is set to "ON" in the conference room setting (S49: Yes) or after S51 is executed, the CPU 32 ends the audio starting process.

In S53, the CPU 32 increments the number of connection. The number of connection to be processed is the number of connection associated with the conference ID matching the conference ID identified in S43. For example, assume that the conference ID identified in S43 is "1234", and that the connection target file is in a state shown in FIG. 7. In this case, the CPU 32 updates the number of connection associated with the conference ID "1234" to "2". After that, the CPU 32 ends the audio starting process.

In the audio starting process of the second embodiment, as described above, the CPU 32 does not execute S47 if a conference ID matching the conference ID included in the start command stored in the RAM 36 at startup of the teleconference program this time is stored in the connection target file (S43: Yes). Accordingly, connection to the speaker 44 by the OS remains unconnected. In this case, the CPU 32 does not execute the sound playing process. The CPU 32 acquires, through the communicator 46, audio data that is received by the communicator 46 by the audio session established in the conference process. However, the CPU 32 does not execute decoding this audio data. Similarly, if the same conference ID is stored in the connection target file (S43: Yes), the CPU 32 does not execute S51. Accordingly, connection to the microphone 52 by the OS remains unconnected. In this case, sound is not collected by the microphone 52, and audio data is not generated. That is, if the same conference ID is stored in the connection target file (S43: Yes), in the conference process corresponding to the start command acquired in S41, both of the sound playing process and the sound collecting process is unexecuted.

In the audio starting process of the second embodiment, as described above, if the microphone mute is set to "ON" in the conference room setting (S49: Yes), the microphone mute can be changed to "OFF" by a particular operation through the operation unit 40. If this particular operation is received by the operation unit 40, the CPU 32 executes a similar process to S51.

<Audio Ending Process>

The audio ending process of the second embodiment will be described while referring to FIG. 8. The audio ending process is started when a termination instruction of a conference process is received. As described above, for example, the termination instruction is received in response to an operation of closing the teleconference screen 60 by the conference process through the operation unit 40. The CPU 32 having acquired the termination instruction and having started the audio ending process decrements the number of connection stored in the connection target file (S61). The number of connection to be decremented is the number of connection associated with a conference ID identifying a teleconference to which the conference process to be terminated is currently connected. For example, the conference ID is identified as described in connection with S41 and S43 of FIG. 6. For example, assume that, when the connection target file is in a state shown in FIG. 7, a conference ID "1234" is identified from the start command "ABCJoin.exe/Server=Japan1.ABCJoin.com/Meeting=1234". In this case, the CPU 32 accesses the connection target file, and updates the number of connection associated with the conference ID "1234" to "0".

Next, the CPU 32 determines whether the number of connection after decrementing is "0" (S63). In the embodiment, the number of connection "0" indicates that there is no conference process. If the number of connection is "0" (S63: Yes), the CPU 32 releases the speaker 44 set to connection in S47 of FIG. 6 and the microphone 52 set to connection in S51 of FIG. 6 or in the above-described subsequent operation (S65). That is, the CPU 32 notifies the OS managing connection to these devices about releasing connection to the speaker 44 and connection to the microphone 52. If connection to the microphone 52 is not set, releasing of connection to the microphone 52 is skipped. If the number of connection is not "0" (S63: No) or after S65 is executed, the CPU 32 ends the audio ending process. In a conference process that is the target of a termination instruction, in some cases, connection to the speaker 44 or connection to the microphone 52 is not set. In this case, the CPU 32 skips executing S65 and ends the audio ending process.

<Third Embodiment>
<Audio Starting Process>

The audio starting process of the third embodiment will be described while referring to FIG. 9. In a similar manner to the audio starting process described above (see FIGS. 5 and 6), the audio starting process is started at timing when the terminal apparatus 30 is connected to the server apparatus 20 and an audio session is established. The CPU 32 having started the audio starting process acquires the start command that is stored in the RAM 36 when the teleconference program this time is started (S71). Next, the CPU 32 determines whether the same execution file as the execution file specified by the specifying information of the execution file in the start command acquired in S71 is currently executed (S73). If the start command is "ABCJoin.exe/Server=Japan1.ABCJoin.com/Meeting=1234", the execution file is "ABCJoin.exe". The OS manages processes that are currently executed. In S73, the CPU 32 makes an inquiry to the OS about whether there is a conference process satisfying both of the following conditions 1 and 2, and acquires a response.

Condition 1: The process ID is different from the process ID identifying the conference process corresponding to the start command acquired in S71

Condition 2: There is a conference process that is currently executed by the same execution file as the execution file of the start command acquired in S71

If there is a conference process satisfying both of the conditions 1 and 2, the CPU 32 determines that an execution file of the same name is currently executed (S73: Yes). In this case, the CPU 32 advances the process to S75. If there is no conference process satisfying both of the conditions 1 and 2, the CPU 32 determines that no execution file of the same name is currently executed (S73: No). In this case, the CPU 32 advances the process to S81.

In S75, the CPU 32 acquires a conference ID. The conference ID to be acquired is a conference ID identifying a teleconference to which a conference process satisfying both of the conditions 1 and 2 is connected. When acquiring this conference ID, the CPU 32 executes inter-process communication with the conference process satisfying both of the conditions 1 and 2. That is, this conference ID is acquired by inter-process communication between the conference process satisfying both of the conditions 1 and 2 and the conference process corresponding to the start command acquired in S71. Next, the CPU 32 determines whether the conference IDs are the same (S77). The conference IDs to be determined are the conference ID included in the start command acquired in S71 and the conference ID acquired in S75. If the conference IDs are the same (S77: Yes), the CPU 32 advances the process to S79. If the conference IDs are different (S77: No), the CPU 32 advances the process to S81.

Here, although different from the embodiment, assume that the number of cameras provided at the terminal apparatus 30 is three or more. In this case, there may be two existing conference processes for which an affirmative determination is made in S73 and that are different from the conference process by the start command acquired in S71. In S75, a conference ID is acquired from each conference process. In S77, it is determined whether the conference ID included in the start command acquired in S71 and each conference ID acquired in S75 are the same. If the conference ID included in the start command acquired in S71 is the same as any one of the conference IDs acquired in S75, an affirmative determination is made in S77 (S77: Yes). In other words, if the conference ID included in the start command acquired in S71 is different from all the conference IDs acquired in S75, a negative determination is made in S77 (S77: No). According to S73 and S77, it is determined whether the startup of the teleconference program this time is a first-time startup (see S73 or S77: No) or a startup in a state where a conference process is executed (S73 and S77: Yes).

In S79, the CPU 32 sets a subsidiary start flag to "ON" (S79). The subsidiary start flag "ON" indicates that the startup this time is a conference process by a startup that is not a first-time startup. In the audio starting process of the third embodiment, the startup this time is a startup of the teleconference program corresponding to the start command acquired in S71. The subsidiary start flag is stored in the RAM 36 in association with the process ID of the conference process by the startup this time. After that, the CPU 32 ends the audio starting process.

In S81, the CPU 32 sets connection to the speaker 44. After that, the CPU 32 starts the sound playing process. Next, the CPU 32 determines whether microphone mute in the conference room setting is set to "ON" (S83). Step S81 and the subsequent sound playing process are executed in a similar manner to S25 of FIG. 5 and S47 of FIG. 6. Step S83 is executed in a similar manner to S27 of FIG. 5 and S49 of FIG. 6. If the microphone mute in the conference room setting is set to "OFF" (S83: No), the CPU 32 sets connection to the microphone 52. After that, the CPU 32 starts the sound collecting process. Step S85 and the subsequent sound collecting process are executed in a similar manner to S29 of FIG. 5 and S51 of FIG. 6. Accordingly, other descriptions for steps S81 to S85 are omitted. If the microphone mute in the conference room setting is set to "ON" (S83: Yes) or after S85 is executed, the CPU 32 ends the audio starting process.

In the audio starting process of the third embodiment, as described above, the CPU 32 does not execute S81 if the same execution file as the execution file specified by the specifying information of the execution file in the start command stored in the RAM 36 at startup of the teleconference program this time is currently executed (S73: Yes) and if the conference ID included in the start command acquired in S71 is the same as the conference ID acquired in S75 (S77: Yes). Accordingly, connection to the speaker 44 by the OS remains unconnected. In this case, the CPU 32 does not execute the sound playing process. The CPU 32 acquires audio data received through the communicator 46 by the audio session established in the conference process. However, the CPU 32 does not decode this audio data. Similarly, if the execution file of the same name is currently executed (S73: Yes) and if two conference IDs are the same (S77: Yes), the CPU 32 does not execute S85. Accordingly, connection to the microphone 52 by the OS remains unconnected. In this case, sound is not collected by the microphone 52, and audio data is not generated. That is, if the execution file of the same name is currently executed (S73: Yes) and if two conference IDs are the same (S77: Yes), in the conference process corresponding to the start command acquired in S71, both of the sound playing process and the sound collecting process are unexecuted.

If S81 is executed, the subsidiary start flag is set to "OFF". The subsidiary start flag "OFF" indicates that the startup this time is a conference process by a first-time startup. If the microphone mute in the conference room setting is set to "ON" (S83: Yes), the microphone mute can be changed to "OFF" by a particular operation through the operation unit 40. When this particular operation is received by the operation unit 40, the CPU 32 executes a similar process to S85.

<Audio Ending Process>

The audio ending process of the third embodiment will be described while referring to FIG. 10. In a similar manner to the audio ending process described above (see FIG. 8), the audio ending process is started when a termination instruction of a conference process is received. As described above, for example, the termination instruction is received in response to an operation of closing the teleconference screen 60 by the conference process through the operation unit 40. The CPU 32 having acquired the termination instruction and having started the audio ending process determines whether the subsidiary start flag associated with the process ID of the conference process to be terminated is "ON" (S91). As described above, the subsidiary start flag is stored in the RAM 36.

If the subsidiary start flag is "OFF" (S91: No), the CPU 32 releases the speaker 44 set to connection in S81 of FIG. 9 and the microphone 52 set to connection in S85 of FIG. 9 or in the above-described subsequent operation (S93). That is, the CPU 32 notifies the OS managing connection to these devices about releasing of connection to the speaker 44 and releasing of connection to the microphone 52. If connection to the microphone 52 is not set, releasing of connection to the microphone 52 is skipped. If the subsidiary start flag is "ON" (S91: Yes) or after S93 is executed, the CPU 32 ends the audio ending process.

<Effects of Embodiments>

According to the above-described embodiments, the following effects can be obtained.

(1) In the teleconference system 10, a plurality of teleconference programs can be started in the terminal apparatus 30 that is used in a teleconference identified by a conference ID. In the terminal apparatus 30, a plurality of processes based on these programs is executed. In the audio starting process of the first embodiment shown in FIG. 5, subsidiary startup information is used, and the start command (ABCJoin.exe/Server=Japan1.ABCJoin.com/Meeting=1234) not including the subsidiary startup information and the start command (ABCJoin.exe/Server=Japan1.ABCJoin.com/Meeting=1234/Child) including the subsidiary startup information are defined. It is determined whether the start command stored in the RAM 36 at startup of the teleconference program this time includes subsidiary startup information (S23 of FIG. 5). If the subsidiary startup information is included (S23: Yes of FIG. 5), neither one of connection to the speaker 44 and connection to the microphone 52 is set (S25 and S29 of FIG. 5 are not executed). If the subsidiary startup information is not included (S23: No of FIG. 5), connection to the speaker 44 is set (S25 of FIG. 5), and connection to the microphone 52 is settable (S29 of FIG. 5).

Figure 6:
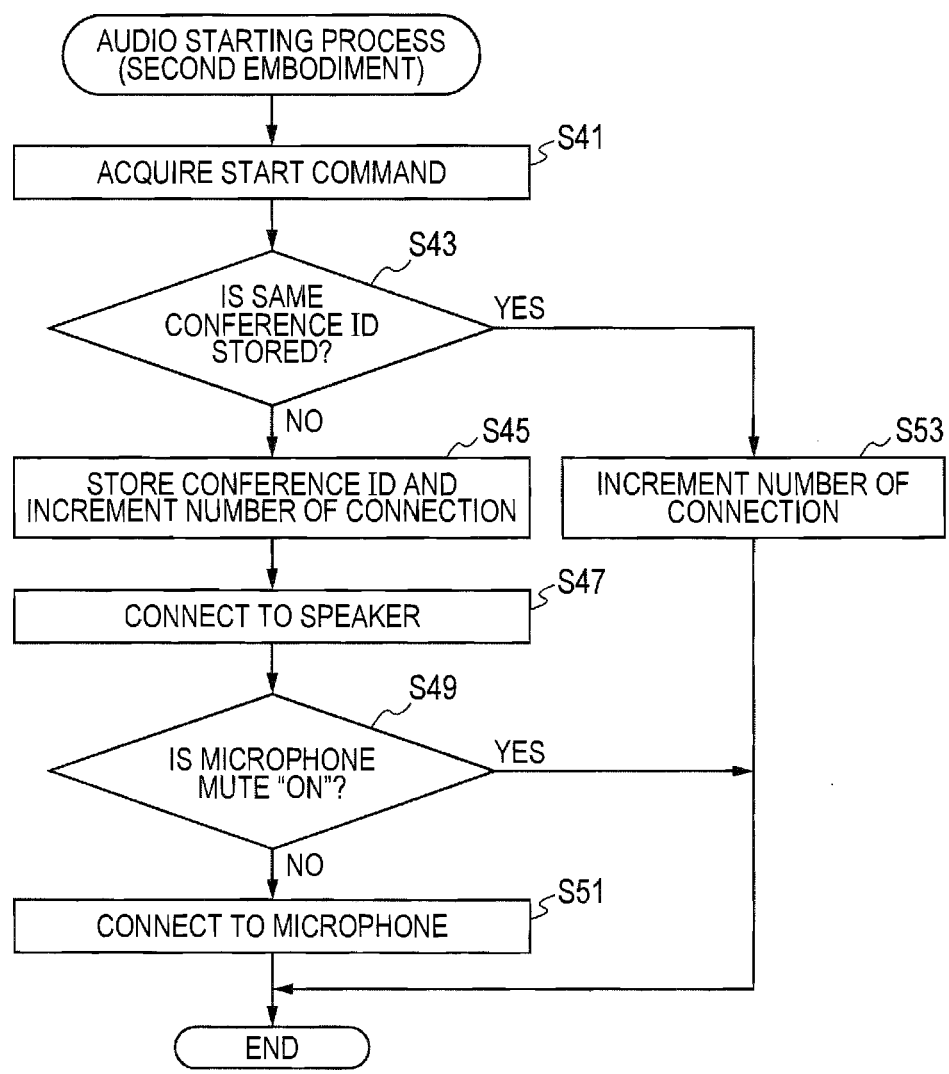
FIG. 6 is a flowchart showing an audio starting process according to a second embodiment.

In the audio starting process of the second embodiment shown in FIG. 6, the connection target file is provided (see FIG. 7). In the connection target file, the conference ID identifying the teleconference to which a conference process is currently connected is stored in association with the number of connections. It is determined whether a conference ID matching the conference ID included in the start command stored in the RAM 36 at startup of the teleconference program this time is stored in the connection target file (S43 of FIG. 6). If the same conference ID is stored in the connection target file (S43: Yes of FIG. 6), neither one of connection to the speaker 44 and connection to the microphone 52 is set (S47 and S51 of FIG. 6 are not executed). If the same conference ID is not stored in the connection target file (S43: No of FIG. 6), connection to the speaker 44 is set (S47 of FIG. 6), and connection to the microphone 52 is settable (S51 of FIG. 6).

Figure 9:
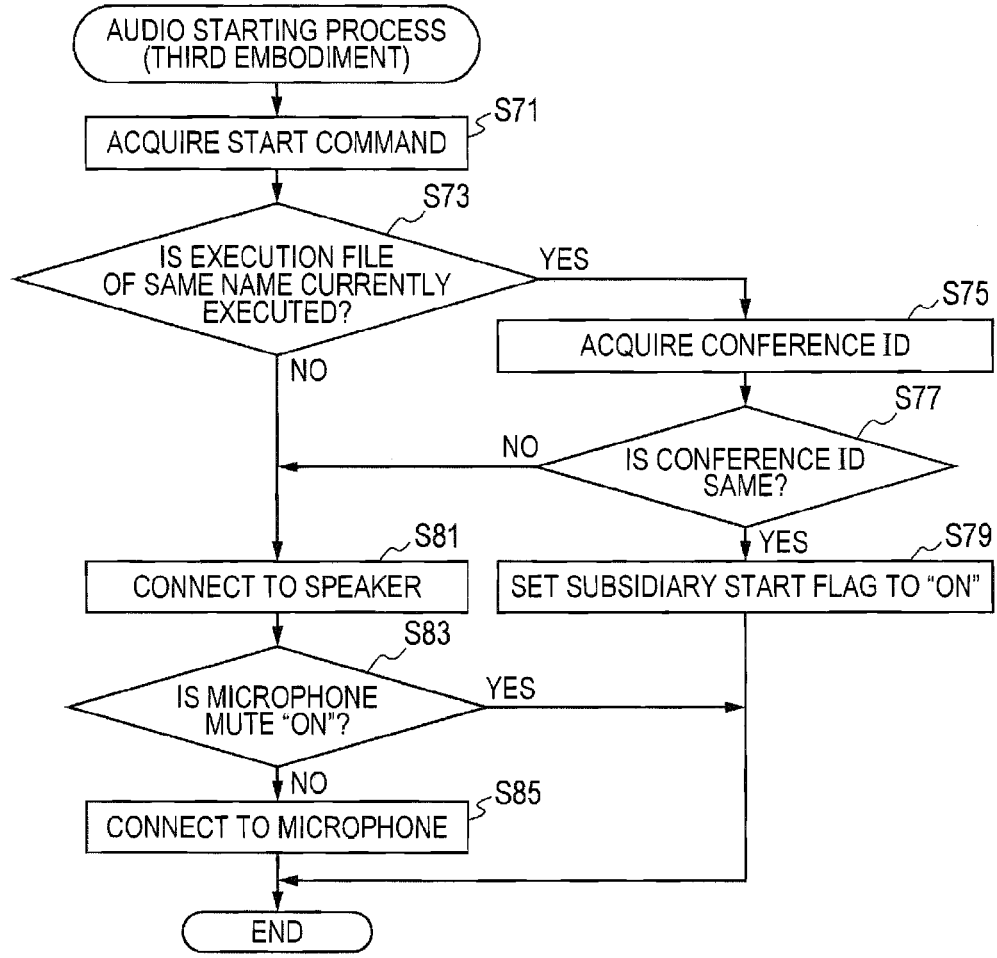
FIG. 9 is a flowchart showing an audio starting process according to a third embodiment.

In the audio starting process of the third embodiment shown in FIG. 9, the CPU 32 having started the audio starting process determines whether the same execution file as the execution file specified by the specifying information of the execution file in the start command stored in the RAM 36 at startup of the teleconference program this time is currently executed (S73 of FIG. 9). This determination is negated if there is no conference process satisfying both of the above-described conditions 1 and 2 (S73: No of FIG. 9), and is affirmed if there is a conference process satisfying both of the conditions 1 and 2 (S73: Yes of FIG. 9). If there is a conference process satisfying both of the conditions 1 and 2 (S73: Yes of FIG. 9), it is determined whether two conference IDs are the same (S77 of FIG. 9). The conference IDs to be determined are the conference ID included in the start command acquired in S71 and the conference ID identifying the teleconference to which the conference process satisfying both of the conditions 1 and 2 is connected and acquired in S75. If the execution file of the same name is currently executed (S73: Yes of FIG. 9) and if two conference IDs are the same (S77: Yes of FIG. 9), neither one of connection to the speaker 44 and connection to the microphone 52 is set (S81 and S85 of FIG. 9 are not executed). If the execution file of the same name is not currently executed (S73: No of FIG. 9) or if two conference IDs are different (S77: No of FIG. 9), connection to the speaker 44 is set (S81 of FIG. 9), and connection to the microphone 52 is settable (S85 of FIG. 9).

Hence, in each audio starting process of the first to third embodiments, when the teleconference program this time is newly started, it can be determined whether there is an existing conference process that is currently connected to the teleconference identified by the same conference ID. If there is a conference process and the startup of the teleconference program this time is not a first-time startup, in the terminal apparatus 30, connection to the speaker 44 is not set and the sound playing process is not executed. It is possible to prevent the same sound from being outputted from the speaker 44 in a superimposed manner, due to a conference process by the first-time startup and a conference process by the startup this time that is not a first-time startup. If the startup of the teleconference program this time is not a first-time startup, in the terminal apparatus 30, connection to the microphone 52 is not set and the sound collecting process is not executed. Audio data from the conference process by the startup this time that is not a first-time startup is not transmitted. Accordingly, the sound playing process for this audio data is not performed in the conference process by the first-time startup. It is possible to prevent sound acquired by the apparatus itself from being outputted from the speaker 44 in the terminal apparatus 30.

In the terminal apparatus 30, if the startup of the teleconference program this time is a first-time startup, both of connection to the speaker 44 and connection to the microphone 52 are set. The sound playing process is started, and sound is outputted from the speaker 44. The sound collecting process is started, sound is collected through the microphone 52, and audio data corresponding to collected sound is generated. The generated audio data is transmitted to the server apparatus 20.

In some cases, a plurality of conference processes is executed in each of the counterpart apparatuses 81, 82. In this case, audio data from each of the counterpart apparatuses 81, 82 corresponds to one conference process that is executed in each communication apparatus. Accordingly, in the terminal apparatus 30, a situation is prevented that a plurality of same audio data is received, and that the same sound is outputted from the speaker 44 in a superimposed manner.

(2) Regarding the conference process started by the audio starting process of the first embodiment (see FIG. 5), when a termination instruction is received, releasing of connection to the speaker 44 and releasing of connection to the microphone 52 are each controlled depending on whether the conference process to be terminated is a process started by a start command not including the subsidiary startup information or is a process started by a start command including the subsidiary startup information.

Regarding the conference process started by the audio starting process of the second embodiment (see FIG. 6), when a termination instruction is received, in the audio ending process of the second embodiment shown in FIG. 8, releasing of connection to the speaker 44 and releasing of connection to the microphone 52 are each controlled depending on the number of connections stored in the connection target file (see S63 and S65 of FIG. 8).

Figure 10:
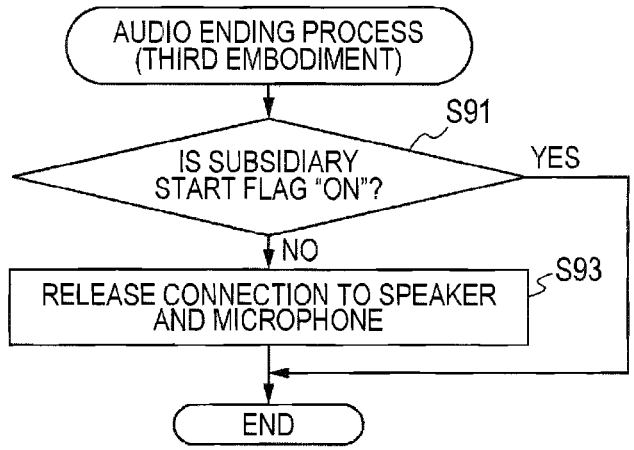
FIG. 10 is a flowchart showing an audio ending process according to the third embodiment.

Regarding the conference process started by the audio starting process of the third embodiment (see FIG. 9), when a termination instruction is received, in the audio ending process of the third embodiment shown in FIG. 10, releasing of connection to the speaker 44 and releasing of connection to the microphone 52 are each controlled depending on ON or OFF of the subsidiary start flag (see S91 and S93 of FIG. 10).

Hence, depending on a usage status of the speaker 44 and/or the microphone 52 in the conference process, releasing of connection to the speaker 44 and releasing of connection to the microphone 52 are executed or not executed. In the terminal apparatus 30, by releasing connection to the speaker 44 and by releasing connection to the microphone 52, the speaker 44 and the microphone 52 can be utilized efficiently.

<Modifications>

While the disclosure has been described in detail with reference to the above aspects thereof, it would be apparent to those skilled in the art that various changes and modifications may be made therein without departing from the scope of the claims. In the following description, like parts and components are designated by the same reference numerals to avoid duplicating description.

Figure 3:
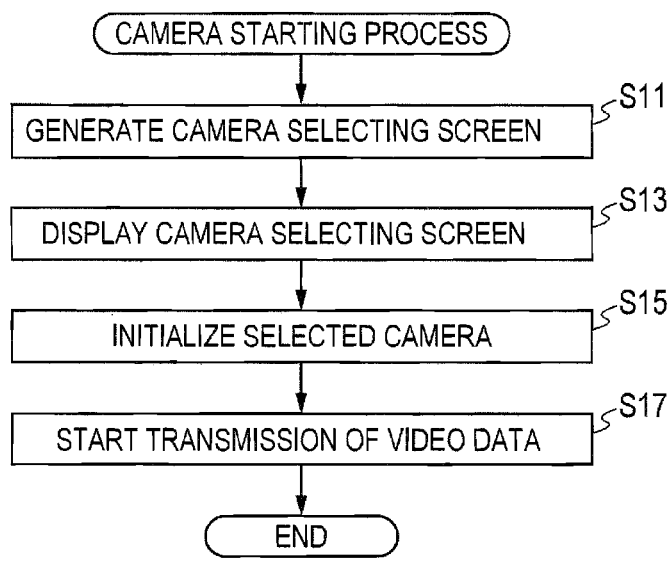
FIG. 3 is a flowchart showing a camera starting process.

(1) In the above-described embodiment, in the camera starting process shown in FIG. 3, the camera selecting screen 70 including the connected camera list is created, and is displayed on the display unit 38 (see S11 and S13 of FIG. 3, FIG. 4). Regarding cameras to be included in the connected camera list, a camera used in an existing conference process may be excluded from the connected camera list. Assume that two cameras 42 and 54 are provided at the terminal apparatus 30 as in the above-described embodiment, and that a conference process is already being executed by using the camera 42. In this case, steps Si 1 and S13 may be skipped at the second-time startup of the teleconference program, and the CPU 32 may automatically select the camera 54 and execute S15 and the subsequent process, as in the above-described embodiment.

(2) In the above-described embodiment, "ABCJoin.exe/Server=Japan1.ABCJoin.com/Meeting=1234" is illustrated as a start command, and a conference ID is included in the start command. In the audio starting process of the first embodiment, "ABCJoin.exe/Server=Japan1.ABCJoin.com/Meeting=1234/Child" is illustrated as a start command including the subsidiary startup information. A conference ID is included in this start command including the subsidiary startup information. However, a start command that does not include a conference ID may be used. In this case, for example, the teleconference program includes a module that displays an authentication screen for user authentication in response to input of the start command. With this configuration, in the terminal apparatus 30, when the teleconference program is started, an authentication screen (not shown) is displayed on the display unit 38. The user of the terminal apparatus 30 operates the operation unit 40 and inputs an ID for authentication in the authentication screen. The CPU 32 acquires the inputted ID for authentication as the conference ID described above.

(3) In the above-described embodiment, in each audio starting process of the first to third embodiments (see FIGS. 5, 6, and 9), if there is a conference process connected to a teleconference identified by the same conference ID at startup of the teleconference program this time and if the startup of the teleconference program this time is not a first-time startup (see S23: Yes of FIG. 5, S43:Yes of FIG. 6, or S73, S77: Yes of FIG. 9), each connection to the speaker 44 and the microphone 52 is not performed. That is, in the audio starting process of the first embodiment (see FIG. 5), steps S25 and S29 are not executed. In the audio starting process of the second embodiment (see FIG. 6), steps S47 and S51 are not executed. In the audio starting process of the third embodiment (see FIG. 9), steps S81 and S85 are not executed.

Each connection to the speaker 44 and the microphone 52 may be set regardless of whether the startup of the teleconference program this time is a first-time startup or is not a first-time startup. In this case, however, the CPU 32 executes the following control. That is, the CPU 32 does not acquire, through the communicator 46, audio data received by the communicator 46 in the audio session established in the conference process. Thus, sound corresponding to audio data received by the communicator 46 is not outputted from the speaker 44, as in the above-described embodiment. The CPU 32 does not control transmission of audio data corresponding to sound collected by the microphone 52. Thus, even if audio data is generated, the audio data is not transmitted from the communicator 46 to the server apparatus 20, as in the above-described embodiment. Or, it may be so configured that audio data is not generated. If it is not a first-time startup, in a conference process that is not a first-time startup, it may be so configured that audio session is not established. If audio session is not established, transmission and reception of audio data are not performed. In this conference process, the CPU 32 neither controls transmission of audio data to the server apparatus 20, nor acquires audio data from the server apparatus 20.

Figure 5:
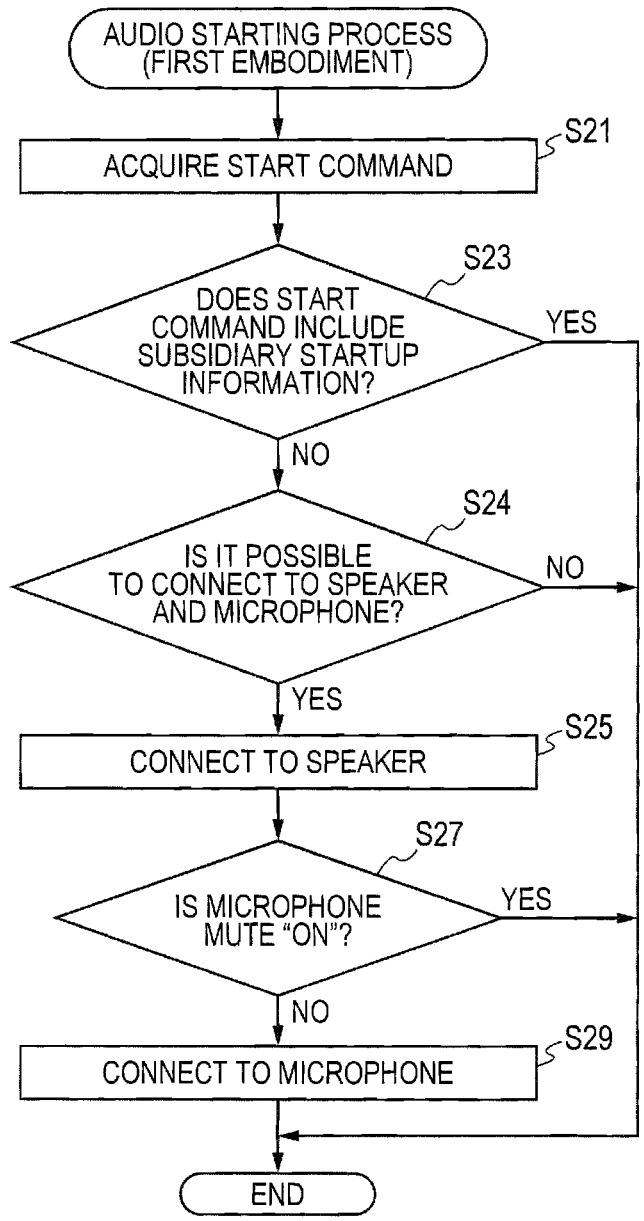
FIG. 5 is a flowchart showing an audio starting process according to a first embodiment.

(3) In the above-described embodiment, the server apparatus 20 stores a conference room setting specifying "ON" or "OFF" of microphone mute and, in each audio starting process of the first to third embodiments (see FIGS. 5, 6, and 9), connection to the microphone 52 is controlled depending on "ON" or "OFF" of the microphone mute in this conference room setting (see S27 and S29 of FIGS. 5, S49 and S51 of FIGS. 6, S83 and S85 of FIG. 9). The microphone mute in the conference room setting may be set to "OFF" all the time. In other words, setting of microphone mute may be omitted in the teleconference system 10. In this case, in the audio starting process of the first embodiment, S27 of FIG. 5 is omitted. In the audio starting process of the second embodiment, S49 of FIG. 6 is omitted. In the audio starting process of the third embodiment, S83 of FIG. 9 is omitted.

(4) In the above-described embodiment, in the audio ending process of the second embodiment (see FIG. 8), the number of connections indicating that there is no conference process is defined as "0" (see S63 of FIG. 8). However, the number of connections indicating that there is no conference process may be defined as "1". In this case, the CPU 32 having started the audio ending process determines whether the number of connections associated with the conference ID identifying the teleconference to which the conference process to be terminated is currently connected is "1". If the number of connections is "1", the CPU 32 decrements the number of connections associated with the conference ID identifying the teleconference to which the conference process to be terminated is currently connected, as in S61 of FIG. 8. Next, the CPU 32 executes S65 of FIG. 8. If the number of connections is larger than "1", the CPU 32 ends the audio ending process without executing each process described above, as in a case where determination in S63 of FIG. 8 is negated (S63: No of FIG. 8).

(5) In the above-described embodiment, each audio starting process of the first to third embodiments (see FIGS. 5, 6, and 9) is started at timing when an audio session is established. The audio session may be established during each audio starting process of the first to third embodiments. For example, in the audio starting process of the first embodiment, the audio session may be established when determination in S24 is negated (see S24: No of FIG. 5). In this case, S25 is executed as in the above-described embodiment after the audio session is established. In the audio starting process of the second embodiment, an audio session may be established when determination in S43 is negated (see S43: No of FIG. 6). In this case, S45 is executed as in the above-described embodiment after the audio session is established. In the audio starting process of the third embodiment, an audio session may be established when determination in S73 is negated (see S73: No of FIG. 9) or when determination in S77 is negated (see S77: No of FIG. 9). In this case, S81 is executed as in the above-described embodiment after the audio session is established.

(6) In the above-described embodiment, in the audio starting process of the first embodiment (see FIG. 5), if the start command does not include subsidiary startup information (see S23: No of FIG. 5), it is determined whether the terminal apparatus 30 can connect to the speaker 44 and the microphone 52 (see S24 of FIG. 5). However, step S24 may be omitted. In this case, if determination in S23 is negated (see S23: No of FIG. 5), the CPU 32 advances the process to S25. If step S24 is omitted, the startup of the teleconference program in a state where a conference process is executed may be limited to a startup by the start button 68 associated with the start command including subsidiary startup information.

(7) In the above-described embodiment, the teleconference system 10 includes the server apparatus 20, and a teleconference executed by the teleconference system 10 is performed through the server apparatus 20. The server apparatus 20 may be omitted, and a teleconference by the terminal apparatus 30 and the counterpart apparatuses 81, 82 may be a P2P type teleconference. In the P2P type teleconference, the terminal apparatus 30 and the counterpart apparatuses 81, 82 perform communication directly through the network 90. As a standard of the P2P type teleconference, WebRTC (Web Real-Time Communication) is known, for example.

(8) In the above-described embodiment, the camera 42 and the speaker 44 are built in the terminal apparatus 30, and the microphone 52 and the camera 54 are connected to the connection I/F 48 of the terminal apparatus 30 (see FIG. 1). The camera, the speaker, and the microphone may be provided at the terminal apparatus 30 in a different manner from that described above. For example, all the cameras may be connected to the connection I/F 48. A speaker may be connected to the connection I/F 48. A microphone may be built in the terminal apparatus 30.

What is claimed is:

1. A teleconference method executable on a terminal apparatus configured to be connected to a network and be used for a teleconference conducted through the network, the method comprising executing a first conference process and a second conference process on the terminal apparatus,
   the first conference process comprising:
      transmitting video data corresponding to a video image recorded by a first camera of the terminal apparatus to the network through a communicator of the terminal apparatus connected to the network;
      transmitting audio data corresponding to sound collected by a sound collector of the terminal apparatus through the communicator to the network; and
      playing audio data acquired from the network through the communicator and outputting sound from a sound output device of the terminal apparatus,
   the second conference process comprising:
      when newly connecting to a teleconference, acquiring conference room information for identifying a teleconference of a connection target;

transmitting video data corresponding to a video image recorded by a second camera of the terminal apparatus through the communicator to the network;

by referring to particular information, determining whether the first conference process is connected to a same teleconference identified by conference room information matching the conference room information acquired when newly connecting to the teleconference; and performing at least one of a first audio process and a second audio process when the first conference process is not connected to the same teleconference without performing either of the first audio process and the second audio process when the first conference process is connected to the same teleconference, the first audio process relating to sound collected by the sound collector, and the second audio process relating to audio data received by the communicator.

2. A non-transitory computer-readable storage medium storing a program executable on a terminal apparatus connected to a network and used for a teleconference that is conducted through the network, the program comprising:

a first acquiring instruction of, when newly starting the program, acquiring conference room information for identifying a teleconference of a connection target;

a determining instruction of, by referring to particular information, determining whether there is an existing conference process executed by the program that is connected to a same teleconference identified by conference room information matching the conference room information acquired by the first acquiring instruction; and an audio processing instruction of performing at least one of a first audio process and a second audio process when there is no existing conference process in a new conference process executed by the program that is newly started without performing either of the first audio process and the second audio process when there is the existing conference process in the new conference process, the first audio process relating to sound collected by a sound collector of the terminal apparatus, and the second audio process relating to audio data received by a communicator of the terminal apparatus connected to the network.

3. The storage medium according to claim 2, wherein the audio processing instruction comprises:

performing all of collection of sound by the sound collector as the first audio process, transmission of audio data corresponding to the sound collected by the sound collector through the communicator to the network as the first audio process, acquisition of audio data received by the communicator as the second audio process, and playing of the audio data acquired through the communicator from the network as the second audio process when there is no existing conference process without performing any of collection of sound by the sound collector as the first audio process, transmission of audio data corresponding to sound collected by the sound collector through the communicator to the network as the first audio process, acquisition of audio data received by the communicator as the second audio process, and playing of the audio data acquired through the communicator from the network as the second audio process when there is the existing conference process.

4. The storage medium according to claim 2, wherein the program further comprising a second acquiring instruction of acquiring a start command for newly starting the program, wherein the determining instruction comprising:

determining that there is the existing conference process when the start command of a new startup acquired by the second acquiring instruction includes subsidiary startup information indicating that the new startup is not a first-time startup; and determining that there is no existing conference process when the start command of the new startup acquired by the second acquiring instruction does not include the subsidiary startup information.

5. The storage medium according to claim 2, wherein the program further comprising a third acquiring instruction of, when newly starting the program, performing inter-process communication between the new conference process and an earlier-started conference process that has been connected to a teleconference, and acquiring conference room information for identifying the teleconference to which the earlier-started conference process has been connected, the earlier-started conference process including the existing conference process; and wherein the determining instruction comprising:

determining that there is the existing conference process when the conference room information acquired by the first acquiring instruction matches the conference room information acquired by the third acquiring instruction; and determining that there is no existing conference process when the conference room information acquired by the first acquiring instruction does not match the conference room information acquired by the third acquiring instruction.

6. The storage medium according to claim 2, wherein the program further comprising:

a fourth acquiring instruction of acquiring a termination instruction for terminating the existing conference process; and a releasing instruction of, when the termination instruction is acquired by the fourth acquiring instruction, releasing connection to the sound collector and releasing connection to a sound output device of the terminal apparatus configured to output sound corresponding to audio data acquired through the communicator from the network.

7. The storage medium according to claim 2, wherein the program further comprising a storing instruction of storing, in a memory area of the terminal apparatus, conference room information for identifying a teleconference to which the terminal apparatus has been connected;

wherein the determining instruction comprising:

determining that there is the existing conference process when the conference room information acquired by the first acquiring instruction matches the conference room information stored in the memory area; and determining that there is no existing conference process when the conference room information acquired by the first acquiring instruction does not match the conference room information stored in the memory area.

8. The storage medium according to claim 7, wherein the storing instruction comprising storing, in the memory area, a number of connection in association with the conference room information, the number of connection being obtained by adding a number of the existing conference process to a number of the new conference process.

9. The storage medium according to claim 8, wherein the program further comprising:

a fourth acquiring instruction of acquiring a termination instruction for terminating one of the existing conference process and the new conference process; and a releasing instruction of releasing connection to the sound collector and releasing connection to a sound output device of the terminal apparatus configured to output sound corresponding to audio data acquired through the communicator from the network;

wherein the storing instruction comprising, when the termination instruction is acquired by the fourth acquiring instruction, decrementing the number of connection stored in the memory area and associated with the conference room information identifying the teleconference connected by a conference process to be terminated, out of the existing conference process and the new conference process; and wherein the releasing instruction comprising releasing connection to the sound collector and releasing connection to the sound output device, when the termination instruction is acquired by the fourth acquiring instruction and when the number of connection stored in the memory area and associated with the conference room information identifying the teleconference connected by the conference process to be terminated indicates that there is neither existing conference process nor new conference process.

10. A terminal apparatus comprising:

a communicator configured to connect to a network;

a processor; and a memory storing instructions, the instructions, when executed by the processor, causing the processor to perform:

transmitting video data corresponding to a video image recorded by a first camera of the terminal apparatus through the communicator to the network;

transmitting audio data corresponding to sound collected by a sound collector of the terminal apparatus through the communicator to the network;

playing audio data acquired from the network through the communicator and outputting sound from a sound output device of the terminal apparatus;

when newly connecting to a teleconference, acquiring conference room information for identifying a teleconference of a connection target;

transmitting video data corresponding to a video image recorded by a second camera of the terminal apparatus through the communicator to the network;

by referring to particular information, determining whether there is an existing conference process that is connected to a same teleconference identified by conference room information matching the conference room information acquired when newly connecting to the teleconference; and performing at least one of a first audio process and a second audio process when there is no existing conference process without performing either of the first audio process and the second audio process when there is the existing conference process, the first audio process relating to sound collected by the sound collector, and the second audio process relating to audio data received by the communicator.

* * * * *